United States Patent [19]
Camhi

[11] Patent Number: 5,825,283
[45] Date of Patent: Oct. 20, 1998

[54] SYSTEM FOR THE SECURITY AND AUDITING OF PERSONS AND PROPERTY

[76] Inventor: Elie Camhi, 131 Country Ridge Rd., Scarsdale, N.Y. 10583

[21] Appl. No.: 674,890

[22] Filed: Jul. 3, 1996

[51] Int. Cl.$^6$ ................................................. B60Q 1/00
[52] U.S. Cl. ..................... 340/438; 340/439; 340/988; 364/413.03; 364/413.04; 701/1; 701/300
[58] Field of Search ....................... 340/438, 905, 340/936, 988, 989, 995, 939, 933; 364/438, 424.03, 424.04, 413.02, 413.03, 413.04; 342/457

[56] References Cited

U.S. PATENT DOCUMENTS

| | | | |
|---|---|---|---|
| 4,241,403 | 12/1980 | Schultz | 364/424.04 |
| 5,058,044 | 10/1991 | Stewart et al. | 364/551.01 |
| 5,223,844 | 6/1993 | Mansell et al. | 342/357 |
| 5,430,432 | 7/1995 | Camhi et al. | |
| 5,450,321 | 9/1995 | Crane | 364/424.01 |
| 5,497,149 | 3/1996 | Fast | 340/426 |
| 5,519,621 | 5/1996 | Wortham | 340/989 |
| 5,552,772 | 9/1996 | Janky et al. | 240/573 |

OTHER PUBLICATIONS

S2RK Satsting informational Brochure 5 pages.
Lojack Informational Brochure, 2 pages.
McEntree, M., "High Speed In Vehicle Networking for Navigation Systems" Automotive Engineering Magazine, May 1996 pp. 34–37.
Demmler, A, Navigation Systems, Automotive Eng. Magazine, May 1996 pp. 65–68.
Unkown, Intelligent Navigation Systems, Automotive Eng. Magazine, May 1996 pp. 71–75.
Nikkel, C., Satellite Guardian Angels of the Highway, Motor Trend, Mar. 1996, p. 34.
Unknown, The Next Step in Personal Security and Vehicle Tracking, Motor Trend, Mar. 1996, p. 42.
Ford Motor Co, RESCU brochure.
Bartlett, J; Lincoln to the "RESCU", Motor Trend, Date & Page Unknown.
Lee, R., Mass Transit Makes the GPS Transition, Radio Resource Magazine Mar. 1995 pp. 46–51.

*Primary Examiner*—Edward Lefkowitz
*Attorney, Agent, or Firm*—Natter & Natter

[57] ABSTRACT

An apparatus for monitoring subjects is provided having location determining device which provides the location of the subject to a processor. The processor is configured to monitor location with respect to pre-defined safety or security related limits including geographical boundaries, and to alert concerned individuals so that proper corrective action may be taken. The geographical boundaries may be programmed remotely by authorized personnel via a communication link. Additionally, processor inputs may be coupled to other systems, equipment or sensors in order to monitor operational variables or outputs of the coupled devices indicative or safety or security concerns. Furthermore, processor outputs may be coupled to other systems, equipment, or output devices, in order to actuate the coupled devices. Moreover, the processor has memory to enable storage and retrieval of data generated or received by the processor. Additionally, the device may be configured to provide interactivity with the user to allow user correction of adverse conditions within a designated time period before the recording and or transmission of the adverse conditions for review by a monitoring authority.

13 Claims, 3 Drawing Sheets

SYSTEM FOR THE SECURITY AND AUDITING OF PERSONS AND PROPERTY

FIELD OF THE INVENTION

The present invention relates to safety and security systems and more particularly, an interactive loss resistant apparatus for enhancing the safety and security of persons and or property.

BACKGROUND OF THE INVENTION

Devices for the promotion of safety and security of persons and property are well known. The most common of these devices may be the automobile alarm. The more basic automobile alarms monitor the opening of doors and sound an alarm if the device has not been disabled. More sophisticated automobile alarms also employ vibration, shock, motion, and sound sensors. These sensors are utilized to detect adverse conditions such as the vehicle being struck while parked, the vehicle being elevated so the rims and or tires can be removed, the vehicle being towed while parked, and the sound of breaking glass. Furthermore, some sophisticated automobile alarms interrupt the ignition or starting systems thereby rendering the vehicle unable to start or run without further time consuming and conspicuous intervention by the unauthorized user.

There are many types of automobile alarms currently available. Some automobile alarms utilize keypads and require that an authorized user, upon entering the vehicle, enter a security code into the keypad before attempting to start the vehicle. Newer automobile alarms utilize remote control units to arm and disarm the alarm. Most of these remote control units also afford the user keyless entry into the vehicle if the vehicle has electric door locks. Many of the automobile alarms utilizing remote control units also have panic buttons incorporated into the remote control units. The panic button may be a separately designated button on the remote control unit or may be a button that serves another function such as locking and unlocking the doors but also serves as a panic button if depressed for a designated period of time. Additionally, many automobile alarms have the capability for a vehicle installed panic button that may be operated by the vehicle occupant.

However, these conventional automobile alarms are limited in applications. Most automobile alarms are incapable of tracking the vehicle. Additionally, most automobile alarms are incapable of monitoring parameters of the vehicle that do not pertain to vehicle theft but are nonetheless important to vehicle and occupant security, such as vehicle speed.

Additionally, these known types of alarms are able to be easily disarmed or circumvented by thieves. Most automobile alarms are merely noisemakers. Therefore, all a thief has to do to circumvent such an alarm is to disconnect the horn or muffle it. Since a majority of car horns are mounted in the front of the engine compartment or between the front bumper and radiator, in many instances, a thief may simply reach behind the bumper or into the engine compartment from below, feel for the wires that attach to the horn and pull with enough force to disengage the wires from the horn. If the horn is mounted in the rear of the engine compartment, a thief may break the car window or gain entrance in a less conspicuous way and actuate the hood release to access the horn and cut the wires that supply power to it. Thieves have also been known to fill horns with shaving cream, rags, or other matter which significantly muffles the emitted sound. As previously stated, depending on the location of the horn, the thief may not even need to open the hood to muffle the horn. Moreover, even if the alarm utilizes an ignition interrupt, a thief may circumvent this feature by running a "hot" wire from the battery to the coil or the ignition module.

Furthermore, even if a thief triggered the alarm, the sounds of automobile alarms in big cities are so commonplace that they barely raise an eyebrow. This is due not only to apathy but perhaps is more due to the fact that the typical automobile alarm falsely triggers quite often. Automobile alarms employing sound sensors can falsely trigger when other alarms are going off nearby, as well as when other loud noises occur near the vehicle such as airplanes passing overhead. Automobile alarms employing vibration, shock, or motion detectors can falsely trigger when another vehicle passes the vehicle containing the alarm at rate of speed that creates air turbulence that moves the automobile.

A recent development related to vehicle theft is the incorporation of vehicle tracking means which provide vehicle location. A basic example of such a system is LOJACK. The LOJACK device works with specialized equipment that must be purchased not only by the vehicle owner but also by the local police. The LOJACK device utilizes a vehicle installed transmitter that emits radio waves when activated. A receiver, tuned to the given frequency of the emitted radio waves and sensitive to direction, is then used by the police to determine the direction of the emitted radio waves and ultimately the location of the vehicle.

However, the LOJACK device is not without deficiency. In order to operate the LOJACK device, not only must the vehicle owner purchase a vehicle installed mobile unit, but the local police must also purchase a complementary unit. If the local police do not have such a complementary unit, a mobile unit mounted inside a vehicle cannot be tracked. Unfortunately, the police, like most governmental agencies, are on fixed and limited budgets and frequently cannot afford to purchase this equipment. Furthermore, with the advent of more sophisticated tracking systems which track with greater precision and which do not require equipment purchases by local police, the future of devices such as LOJACK is uncertain.

Before the police can track a vehicle equipped with LOJACK, they must be informed of the theft by the vehicle owner, since a signal from police equipment is required to activate the vehicle installed unit. If the vehicle owner is not aware of the theft immediately after it has occurred, the delay in contacting the police may provide the thief sufficient time to locate and or disable the vehicle installed unit or perhaps even move the vehicle outside the range of the receiver. Moreover, since the LOJACK device operates through the use of radio waves, consequently and paradoxically, the directional receiver must be located relatively near the vehicle in order to determine vehicle location. Additionally, if the vehicle containing the transmitter is moved into an enclosed truck body, underground parking garage, or some other location where structure blocks the transmission and reception of radio waves, the LOJACK device can be impaired or even rendered useless. To the extent that thieves are becoming increasingly familiar with the technology utilized by modern security devices, they will likely take advantage of this knowledge in order to defeat the devices.

Another automobile tracking device on the market is the Satsting by S2RK Advanced Technologies, Inc. The Satsting utilizes the satellites of the Global Positioning System to provide location information, i.e., latitude, longitude, and altitude coordinates.

The Global Positioning System is a navigation system consisting of a man made constellation having twenty-four satellites orbiting approximately 11,000 miles from the earth that continuously broadcast their identity and location via electromagnetic signals. These signals are encoded with the time that they were transmitted from the satellite. Therefore, by subtracting the encoded transmission time from the time of reception by a GPS receiver, the propagation time delay between transmission and reception of the signals can be determined. Relative position of the GPS receiver can then be derived by knowing the propagation time delay and the speed at which electromagnetic waves travel through the atmosphere.

Position via GPS can also be determined via the satellite position data encoded in the electromagnetic signal. However, the satellite position data is updated only once an hour by the GPS satellites. By simple geometry, specifically triangulation, the location of the GPS receiver can be determined. The use of triangulation to determine location is well known, having been used to determine position from such objects as stars or terrestrial objects. The more satellite signals acquired by the GPS receiver, the more accurate the location information.

Tracking devices utilizing GPS technology offer advantages over systems using other means as heretofore known. Perhaps the most significant advantage in using GPS technology is that it is operational in any weather. Other advantages in using GPS are that it is available worldwide, twenty four hours a day, three hundred and sixty five days a year. While real stars are present for use worldwide, they may not also be visible under certain weather conditions.

GPS presently offers two levels of signal accuracy, military and commercial. The military signal is scrambled and is thus useless to anyone not privy to the code, although it affords pinpoint accuracy. On the other hand, the commercial signal is not scrambled, but is modified to only offer accuracy to within several hundred feet. The rationale behind utilizing the two signals is that the United States does not want the military signal and its corresponding greater degree of accuracy to be used by its enemies to aim their weapons with precision. Thus, non-military applications of GPS technology utilize the commercial signal emitted from the GPS satellites. At the time of this writing, it is believed that the higher accuracy military signal will be made publicly available, and other means will be used to guard against "unfriendly" use thereof.

The Satsting is primarily intended as a covert operations device. The vehicle installed unit of the Satsting transmits vehicle identification and location information to a monitoring station via cellular technology, although it may also transmit via VHF and UHF technology. The monitoring station then tracks the vehicle on digitized street maps. The software associated with the Satsting and many commercially available mapping systems is capable of automatically selecting the appropriate map for display while simultaneously tracking the vehicle. The monitoring station can receive the vehicle identification and location information as often as every 10 seconds. The information received by the monitoring station may then be conveyed to the police or appropriate authority until the vehicle is intercepted.

A consumer adapted application of the Satsting provides personal security in the form of a panic button that allows the vehicle occupant to discreetly alert the monitoring station in the event of an emergency. Additionally, the Satsting employs a memory function which can store location coordinate information for later recall.

The Satsting is not, however, without deficiency. It cannot detect "unsafe" or "insecure" conditions, and consequently, cannot warn the device user or other person of such conditions. Thus, in circumstances where the monitoring station is unaware of an emergency situation, such as when the vehicle is stolen and the vehicle owner is not yet aware of the theft, and accordingly has not alerted the monitoring station to that fact, or when the vehicle is car-jacked, and the vehicle occupant is unable to actuate the panic button, the device is of no aid to the device user.

Furthermore, the Satsting tracking means is via GPS technology. Devices utilizing the GPS technology are similar to devices using radio waves in that, generally, the reception and transmission of such signals may be significantly attenuated or blocked by common construction materials such as metal and concrete. This same limitation applies to the communication means of the Satsting, i.e., cellular, VHF, or UHF technology. Therefore, if a thief moves the vehicle to an underground parking garage or other structure, the vehicle installed unit will not only be unable to transmit location information to the monitoring station, it will also be unable to receive location information from the GPS satellites. In such a situation, even if the vehicle is later moved to a location where signal reception and transmission is possible, the prior locations of the vehicle during the time period that signal reception and transmission were blocked will be unknown and consequently unrecorded. Sometimes where the subject has been is more important than recovery of the subject, such as in the case of a chop shop. For example, if the device is mounted within a vehicle which passes through a chop shop where the signal is blocked, the location of the shop may not be able to be determined even after the remains of the vehicle have been moved and the device is again able to receive the transmit signals.

A newer GPS vehicle tracking system is the On-Guard tracking system by ATX Research Inc. This device utilizes GPS and cellular technology to provide vehicle location, speed, and direction to a central or monitoring station. Literature accompanying the system claims location accuracy to within fifty meters. The system includes the installation of a panic button inside the vehicle. Additionally, the system offers the user the capability to directly communicate with the monitoring station via the cellular phone handset, and conversely, allows the monitoring station to "listen in" or monitor the conversations in the vehicle in order to ascertain the nature of an emergency. This communication capability can be utilized by the monitoring station to communicate with any unauthorized vehicle occupant in order to inform them that the vehicle is being tracked. However, in most cases where the communication capability may be helpful to "listen in" on criminal activity, it is unlikely that the feature would be of use without the vehicle occupant first actuating the panic button to alert the monitoring station of the adverse situation. Furthermore, should the vehicle be hidden in a parking lot or other location where many other vehicles are present, the On-Guard system allows the monitoring station to honk the vehicle's horn so that the monitored vehicle may be easily identified and located, thereby overcoming the system's lack of accuracy. Moreover, the system allows the monitoring station to kill the vehicle's engine, if appropriate, to aid in vehicle recovery.

Additionally, the On-Guard system offers several non-emergency related services. The system offers navigation and roadside assistance services. A promotional video defining the optional services available through the On-Guard system states that directions to restaurants, hospitals, ATMs, sports complexes, and tourist attractions may be provided to the vehicle occupant by the monitoring station. Also, the system continuously monitors the vehicle battery voltage level, thus allowing the monitoring station to alert the vehicle user that the vehicle lights may have been left on, or other condition which could cause the vehicle not to start. Furthermore, the system allows for the opening of doors by the monitoring station in the event the vehicle user has locked his or her keys in the vehicle.

The On-Guard system is not limited to the civilian market of vehicle and personal security. According to the literature provided by ATX, the system has been utilized by the police to monitor "bait cars"—vehicles placed in high theft areas as bit for unsuspecting car thieves. In such situations, the tracking system helps the police maintain a greater following distance so that the thief feels safe enough to take the vehicle back to a chop shop, hopefully enabling police to arrest more criminals guilty of more serious offenses.

Similar to the above devices, the On-Guard device is not without deficiency. The system utilizes the antiquated cellular phone design of a cellular phone base and physically separate handset. While this design is currently inexpensive, the reason for the low cost is the fact that the design has been superseded by far superior designs with regard to size and quality. Furthermore, since the design is antiquated, availability of these old units will dissipate and eventually disappear over time, or become more costly due to limited production for such special applications.

Additionally, once the handset is removed or damaged, the voice communication capability is severed and the vehicle user will be unable to receive directions or inform the monitoring station that a tow-truck or other service is required. Actuating the separate panic button in the situation where a tow-truck is needed is inappropriate to say the least.

Moreover, the On-Guard system requires that the vehicle operator enter a code into the cellular phone handset when entering the vehicle much like the keypad alarm described above. Once this code is entered, if something occurs, such as car-jacking, and the panic button is unable to be actuated, the monitoring system will not be able to know is something is wrong. This is an easily foreseeable scenario.

Additionally, some vehicle tracking systems utilize GPS as the primary means of vehicle tracking but also provide a redundant means of tracking known as a dead-reckoning system which maintains the vehicle's position even when the GPS signal is lost. Dead reckoning systems track objects by measuring the distance traveled by the subject and its direction from the subject's starting point. As an example, a dead reckoning system may be comprised of a compass to determine vehicle direction and the vehicle's anti-lock brake sensors to measure the number of wheel revolutions in a given time and consequently vehicle speed, distance, and direction traveled. From these parameters, the vehicle location can be determined. However, since the accuracy of the location information provided by a dead reckoning system suffers cumulative error, and depends on an accurate calculation of the vehicle starting point, a miscalculation of the tire size or starting point may render such a system useless.

While the above referenced devices are after-market devices, automobile manufacturers have also realized the potential of vehicle tracking security systems. For example, Ford now offers a device called RESCU (Remote Emergency Cellular Unit) which uses GPS and cellular technology. The device consists of a pair of buttons located in the overhead console, a trunk-mounted GPS receiver, and a voice-activated cellular phone. One button is represented by a tow-truck icon and the other button is represented by an ambulance icon. The vehicle occupant must push the appropriate button to elicit the desired response. In either case, an operator at the Lincoln Security Response Center responds via the vehicle's cellular phone while the car is simultaneously tracked via the trunk mounted cellular telephone unit and GPS receiver. The RESCU system transmits the vehicle location, vehicle identification number, last recorded speed and direction of the vehicle, a time tag identifying when the last position was taken, and the vehicle cellular telephone number. The RESCU system offers advertised location accuracy to within one hundred feet. Additionally, the RESCU system offers a conventional remote control alarm system as an option to further enhance vehicle security.

Similar to the above mentioned devices, the RESCU device suffers from the susceptibilities of GPS and cellular technology. Furthermore, the system is not automatic and requires occupant action to activate the system. Accordingly, if the occupant is injured or unable to activate the system due to the presence of a criminal, the system is of no help.

GPS technology has been utilized in marine applications to provide the location of boats. The typical GPS device used by boaters comprises a handheld or larger unit which simply provides the location of the device to the user. Additionally, GPS systems have been utilized for aeronautical applications to provide location. This technology is currently in use by the military to provide the location of aircraft and to guide aeronautical weapons, and is also currently being used by the commercial airline industry. Normally, radio beacons are used for commercial aeronautical navigation, but GPS navigation systems are becoming more accurate, and hence, more prevalent, although not yet approved by the FAA for certain applications.

It would be desirable for such systems to afford the device user or other person associated with the monitored subject the capability to program a pre-defined travel route or routes and further, to sound an alarm or provide other means to alert the user or other person that the subject has gone outside the safe and reasonable boundaries. Such features would enable corrective means to be implemented to correct the direction of travel before the subject significantly deviates from its intended course.

Additionally, such features could also be used to alert a monitoring authority that the subject has deviated from its intended course which may be indicative of a foul play or other adverse condition. Thus, a GPS location providing device which further incorporates means for programming intended routes of travel and means for alerting a monitoring authority that the device has traveled outside of the pre-defined boundaries allows a monitoring authority to be made aware of not only an adverse condition such as a sunken boat or plane crash, but also allows the monitoring authority to locate the tracked subject, be it a boat, plane, car, shipment of goods, or person.

Alternatively, vehicle safety monitors which monitor vehicles for unsafe driver conditions are also well know. Some of these types of devices warn the vehicle driver of the unsafe condition after it has already occurred, such as the dashboard installed LED used in Chevrolet Camaros and Corvettes which warn that vehicle traction is low and consequently that the vehicle operator has exceeded the reasonable limits of the vehicle performance envelope, and that an active corrective system has been invoked. Thus the vehicle operator is notified that but for the automatic corrective action, vehicle control would likely have been lost.

The above represent vehicular safety systems which are triggered by direct initiative of the user or are fully automatic.

Perhaps a more sophisticated device of this type, at least in terms of social consideration, is the Automotive Warning and Recording System, U.S. Pat. No. 5,430,432, incorporated herein by reference, as if more fully set forth. This device provides real time warning, and if uncorrected, recording of automobile and or driver unsafe conditions. The Automotive Warning and Recording System is comprised of a timer equipped processor or microcontroller, a storage unit, indicators, and sensors which are used to determine vehicle and or driver unsafe conditions as well as other vehicle operating parameters.

The Automotive Warning and Recording System operates by monitoring certain vehicle parameters such as vehicle speed, extreme braking or acceleration, seat belt use and high g-force cornering. Additionally, the system can be configured with proximity detectors for detecting the vehicle's proximity to other vehicles and obstacles, as well as sensors to monitor battery voltage, headlights, windshield wipers, steering wheel position, throttle position, directional indicators, and the like.

Perhaps the most significant feature of the Automotive Warning and Recording System is it's interactivity with the vehicle driver. When an unsafe condition is detected by the system, the system indicates to the driver by easily perceivable means, that an unsafe condition is present. The driver then has a pre-defined period of time to correct the situation before the occurrence of the situation is recorded for future review. Thus, the driver is given a "forgiveness" period to correct the situation. This "forgiveness" period is useful in determining if the driver is driving at higher speed for a short period such as to pass another vehicle or if the driver is habitually driving in an unsafe manner. If the vehicle operator engages in an act momentarily which would otherwise be considered unsafe, as is frequently necessary to avoid road hazards or the like, the information is not recorded because the situation will be corrected within the "forgiveness" time period. However, if a driver constantly drives in an unsafe manner without heed to the warnings, then the unsafe conditions will be recorded for future review. It is this interactivity between the system and the vehicle driver that allows the vehicle driver control over what is recorded. Careful selection of warning limits, preferably in conjunction with monitoring of ambient conditions, can serve to warn a driver before an unsafe condition, such as loss of traction, occurs. This interactivity also serves to confirm the accuracy of the monitored parameters. For example, if the vehicle operator is constantly being warned of a pre-defined unsafe condition which does not really exist, he or she will no doubt give this feedback to the system administrator.

The Automotive Warning and Recording System is of paramount use to a vehicle driver for obvious reasons. However, the system is also of paramount use to insurance companies, who can reconstruct accidents by reviewing the information stored in the recorder, similar to recreating airplane crashes through the review of the information stored in an airplane's "black boxes." It may also be used by insurance companies to determine which drivers are high risks and which are not, and adjust their insurance premium accordingly. Additionally, such a device is of use to parents, who may monitor the driving habits of their children and correct any bad acts before they develop into long term bad habits. Unfortunately, the Automotive Warning and Recording System cannot monitor the driving habits of individuals with whom their children associate, but nonetheless, affect the security of their children equally. Furthermore, such a system is also of great utility to fleets which can monitor their driver's habits and "weed out" poor, reckless, or abusive drivers.

Alternatively, devices used to monitor people, as opposed to vehicles, are also well known. Perhaps the most familiar application of such a device pertains to the concept of house arrest. Typical house arrest devices operate by detecting when the subject, who is wearing a transmitter, moves too far from a receiver located in his or her home or other place of detainment. If the receiver does not receive the transmitted signal or receives a signal significantly attenuated due to the distance between the receiver and the transmitter, an auto-dialer, which is coupled to the receiver on one end and the phone line on the other end, is triggered to alert the proper authorities.

This type of device, like the devices above, is not without deficiency. Although the device alerts the authorities that the subject has gone outside a pre-defined area, it does not provide the location of the subject. Furthermore, since the device is supposedly tamper proof, it would be desirable for such a device to have the capability of one-way and two-way voice communication. One-way communication would allow the proper authorities to "listen in" on any conversation or actions and two-way communication would allow the authorities to communicate with the subject and induce him or her to return to custody or suffer the consequences.

Consequently, a device used to track people offers many practical and useful applications beyond the monitoring of criminals. Children, Alzheimer patients, the mentally retarded, the disabled, infirm individuals, and other similarly situated persons may be monitored and located should they become lost.

Alternatively, personal security devices are also well known. The most common personal security device is the small container with a panic button, implemented via pull cord, grenade type ring, or other means easily actuated but difficult to reset. When the panic button is actuated, a loud sound is emitted to scare off attackers and or alert nearby people to a potential emergency. However, such a device is of no consequence when there is no one nearby to hear the alarm or if those nearby will not act. Another personal security device, well known for its advertising with an elderly person who has fallen and can't get up, uses a necklace worn panic button and auto-dialer. These devices operate by requiring the user to actuate the panic button in the event of an emergency, thereby initiating the auto-dialer which contacts the appropriate authorities, and delivers a pre recorded message.

Medical monitoring devices are also well known. They are used in clinics, hospitals, and doctor's offices around the world, and often are able to give early warning to medical professionals of impending adverse health conditions, where the individual does not even sense the decline until significantly later, after the situation has significantly progressed, the individual suddenly feeling terrible, debilitated, or worse. Many times, the relaxed and controlled hospital environment can reduce or eliminate the sources of adverse health conditions, such as exertion, stress, noise, toxins, diet, etc. Accordingly, more sophisticated medical monitoring devices have been developed which are miniaturized, battery operated versions of hospital equipment for home or ambulatory use, such as electroencephalogram (EEG) machines, electrocardiogram (EKG) machines, blood pressure, sugar, or oxygen saturation monitors, and the like. While these portable machines monitor vital body functions in a real world situation, they merely record this information. The most sophisticated known variants of these devices can take the recorded information, digitize it, and then modulate the information back onto an analog carrier signal, which can then be transmitted to a central station via simple acoustic coupler modem.

None of these medical monitoring devices is known to have means to contact the appropriate medical authorities automatically in the event the monitored parameters are indicative of a medical emergency. Therefore, upon the occurrence of an actual medical emergency, the wearer is likely to be unable to operate complex equipment, even if lucky enough to have that equipment and a telephone close at hand. Furthermore, even if a particular system could convey the actual information generated by the medical monitoring equipment, crucial time may be lost in determining the location of the person in need of the emergency medical treatment. Accordingly, these known devices are limited to usage where the possibility of the user requiring instructions or attention in somewhat prompt fashion is relatively remote.

Therefore, it would be desirable for a medical monitoring system to be able to not only monitor the output of medical devices, but to be able to immediately provide the location of the individual should the individual require immediate medical attention. Furthermore, it would be desirable for such a device to have the capability to inform numerous remote locations of an event, such as a doctor, family member, hospital, and or ambulance service.

Accordingly, a need exists for a device offering a variation upon a combination of the features of the aforementioned safety and security systems, while overcoming the deficiencies thereof. Thus such a device should enable tracking the location of people and property in conjunction with the capability of user programmable geographical boundaries and the ability to automatically alert the proper authorities if a subject travels outside the programmable boundaries. It would be further desirable for such a device to maintain its ability to determine location even if the means to communicate location to a monitoring station or other remote location is interrupted or interfered with. It is further desirable to have such a device which is also able to monitor and or interact with other systems or equipment. Additionally, it would be desirable if such a device could monitor vehicle, personal, or other unsafe conditions in terms of speed, position, or other predefined, measured, or calculated state pertaining to the subject and record the occurrence of such conditions, but also employ an interactive feature which allows the subject or other associated therewith the opportunity to correct the unsafe condition before the generation of an alarm condition or communicating to a remote location or recording the condition's occurrence. Moreover, it is desirable for such a device to have the selective capability for one-way and two-way audio, video, and data communication.

OBJECTS AND ADVANTAGES

It is therefore an object of the instant invention to provide a device which tracks the location of a subject, be it person or object, and compares the actual location with predefined or stored geographical boundaries representing locations that are less than safe or secure, and which alerts the device user or other designated personnel that the tracked subject has gone outside the geographical boundaries.

It is another object of the instant invention to provide a device which tracks the location and circumstances of a subject, be it person or object, and compares the actual location with predefined or stored geographical boundaries representing locations that are less than safe or secure under such circumstances, and which alerts the device user or other designated personnel that the tracked subject has gone outside the geographical boundaries.

Another object of the instant invention is to provide a device which tracks the location of a subject, be it person or object, and compares the actual location with predefined or stored geographical boundaries in order to determine if the subject has or is about to deviate from its intended route, and provides an indication to the device user or monitoring authority of the situation in order to allow the subject to correct the situation before a significant deviation from the intended route occurs.

It is a further object of the instant invention to provide a device which is able to detect kidnapping, and covertly transmit information pertaining thereto elsewhere.

Yet another object of the present invention is to provide a device which automatically alerts family members directly when their children are dropped off or picked up by the school bus.

Still another object of the instant invention is to provide a device which monitors the circumstances of a police officer or police vehicle, and automatically summons assistance if the monitored circumstances coincide with predefined circumstances suggesting the officer may be in danger or need of assistance.

Another object of the instant invention is to provide a device which monitors the circumstances of a police officer or police vehicle, and if the monitored circumstances coincide with predefined circumstances suggesting the officer may be in danger or need of assistance, automatically notifies the officer in covert fashion that assistance will be summoned, offers the officers means to cancel the call, and if not canceled within a pre defined reasonable time, automatically summons assistance.

Yet another object of the instant invention is to provide a device which monitors the circumstances and location of a police officer or police vehicle, and if the monitored circumstances coincide with predefined circumstances suggesting the officer may be in danger or need of assistance, automatically notifies the officer in covert fashion that assistance will be summoned, offers the officer means to cancel the call, and if not canceled within a pre defined reasonable time, automatically summons assistance and transmits the location of the officer or vehicle.

A further object of the instant invention is to provide a device which warns a person when they are in or are approaching an unsafe, unhealthy, undesirable, or insecure place, whether by pre definition of the place or by real time measurement of conditions and comparison to predefined normal ranges.

Another object of the present invention is to provide a medical device which monitors the bodily functions of a person, and when those functions depart from a predefined normal range, warns the person of the condition, displays advice for correcting the situation, and transmits information pertaining to the situation to a remote location if the situation is not corrected within a reasonable time.

Still another object of the invention is to provide a device which can detect the attempted theft of a vehicle, thwart the theft, and capture and subdue the thief, and transmit information to another location pertaining to the events and location of the vehicle.

Yet another object of the invention is to provide a device which can detect the attempted theft of goods in transit, and automatically destroy or diminish the value of the goods.

It is also another object of the present invention to provide a device which tracks subjects and can determine and store location information even in the event reception of GPS signals is inadequate and where transmission of location is rendered impossible.

It is another object of the present invention to provide a device which tracks the location of subjects in real time.

Still another object of the present invention is to provide a device which can track thousands of subjects simultaneously.

Yet another object of the present invention is to provide a safety and security system that can be used worldwide.

Still another object of the present invention is to provide a device to alert the device user or other person or persons to the occurrence of an event.

It is yet another object of the present invention to provide a device which warns the device user that a subject unsafe condition exists and will generate an alarm condition or record the occurrence of the vehicle unsafe condition if the device user does not correct the situation within a predefined time period.

It is another object of the present invention to provide a device to alert a monitoring station upon the actuation of a panic button or to the occurrence of an event.

it is yet another object of the present invention to provide a device by which one or two-way communication may be enabled as required by the circumstances.

It is still another object of the present invention to provide a device which can monitor other systems or equipment such as automobile and medical systems and equipment.

It is yet another object of the present invention to provide a device which can interact with other systems or equipment to achieve a desired result such as actuation of car door locks.

A further object of the present invention is to provide a device which can record and store location information, voice communications, the occurrence of events within the monitoring function of the device for review at a later time.

Still another object of the present invention is to provide a device which can initiate and make contact with numerous remote locations if required in response to a detected or unsafe condition.

Another object of the present invention is to provide a method for encouraging safety and security of subjects, be they persons or property.

Other objects and advantages of the present invention will become apparent to those of skill in the art upon contemplation of the disclosure herein in conjunction with the drawings.

SUMMARY OF THE INVENTION

According to the instant invention, an apparatus for monitoring subjects, be they objects or persons, is provided, which comprises a location determining system, display means and memory all coupled to a processor. The memory contains data identifying locations significant to the subject and programming by which the processor compares the subject's actual measured location to the stored locations, and employs the display means to indicate substantial coincidence of the compared values. Input channels may be used for the acquisition of additional information for comparison purposes or storage, and output channels may be used to effectuate additional functions as appropriate according to the results of the comparisons. The apparatus may also be equipped with a communications device for the generation of remote alarms, as well as for transmission of information indicative of the results of the monitored conditions, comparison results, and subject location. Data indicative of predefined geographical boundaries is stored in memory, and may be additionally downloaded to memory by means of the communications device. These geographical boundaries may be inclusive or exclusive so as to define areas within which the subject must remain, or which the subject must stay out of, respectively, in order to prevent the generation of an alarm condition. An alarm condition may include the actions of transmission or recording information pertaining to the events which have occurred for immediate intervention or later review by a supervisory authority, or substantially direct actuation of auxiliary equipment. Alarm conditions may be preceded by a warning period wherein the subject or person most closely associated therewith is given notice of the impending action, and given an opportunity to correct the condition or take other measures in order to cancel the alarm actions.

BRIEF DESCRIPTION OF THE DRAWINGS

In the drawings, wherein the same reference numeral denotes the same element throughout the several views.

DESCRIPTION OF THE PREFERRED EMBODIMENTS

Figure 1:
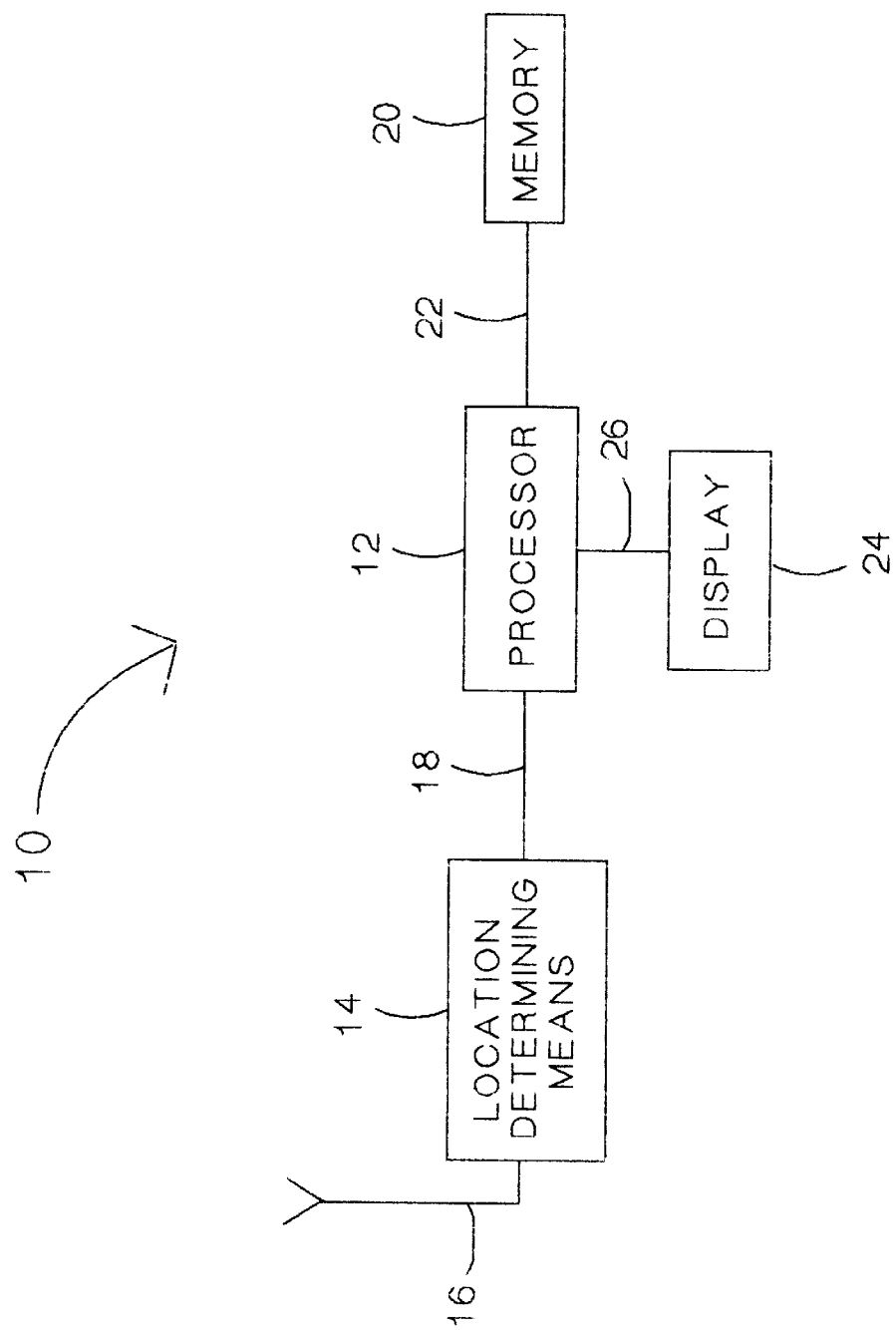
FIG. 1 is a block diagram of a basic embodiment of the present invention, an apparatus for enhancing the safety and security of persons and or property.

Next, description will be given with respect to the preferred embodiments of the present invention by referring to the drawings.

The block diagram of FIG. 1 illustrates the most basic embodiment of the instant invention's apparatus for enhancing the safety and security of persons and or property (10). The device may be fitted to a subject such as an automobile, airplane, boat, cargo, container, or person.

The system is designed to operate from either a vehicle battery or a separate power source, such as a battery pack, or combination thereof, not shown.

The present invention utilizes a processor (12) equipped location determining means (14). Location determining means may be implemented through any means as heretofore known, such as dead reckoning, GPS, laser, microwave, RF, stellar, and ultrasonic, as well as any location determining means which may be invented in the future.

The preferred determining means (14) at the time of this writing, in consideration of the present technology, is through the use of GPS and its associated antenna (16). Furthermore, the preferred embodiment of the present invention (10) should utilize a redundant means to provide location which does not share the aforementioned susceptibilities of GPS. The redundant location determining means is utilized to provide location in the event that signal transmission and reception is rendered impossible. The preferred redundant location determining means at the time of this writing is via dead reckoning system.

The location information provided by the location determining means (14) is fed into the processor 12 via the location determining means input line (18). The processor (12) utilizes the information provided by the location determining means (14) to determine position.

The processor (12) utilizes a memory means (20) to store operational code. The memory means is responsively coupled to the processor via memory line (22). The memory (20) further contains data identifying locations significant to the subject and programming by which the processor (12) compares the subject's actual measured location to the stored locations, and employs the display means (24) to indicate substantial coincidence of the compared values. The display means (24) is coupled to the processor (12) via display line (26). The memory means (20) may also be used to record location and or other information handled by the processor (12). The memory means (20) may take the form of any memory as heretofore known, such as magnetic or optical disk drive, tape, card, non-volatile integrated circuit memory, or any combination thereof, as well as any memory means which may be invented in the future.

The preferred processor (12) for use in the present invention at the time of this writing is a 386ex processor due to its size, cost, and capability. The preferred memory means for use in the present invention at the time of this writing is substantially non-volatile integrated circuit memory. This type of memory is desirable because of its size, lack of moving parts, and reduced susceptibility to failure from the vibration, shock or other environmental conditions associated with a mobile environment. Furthermore, the preferred display means (24) may vary according to the application for apparatus (10), and may take the form of visually, audibly, or tactile sensed means, or any combination thereof, including touch sensitive or heads up alphanumeric or graphic display, voice synthesis unit, pager, horns, lights, buzzers, LEDs, or other indicators as heretofore known. This display line (26) may be a wireless link to the subject associated with the corresponding apparatus (10), where the monitored subject is inanimate or otherwise unable to use the feedback information.

Thus, the present invention allows the device user to be warned or alerted to the fact that he or she has or is about to enter or exit a pre defined boundary which is related to safety or security under the circumstances. For example, the present invention may be used by people who are hunting, swimming, fishing, hiking, skiing, climbing, or the like, so as to ensure that they do not go outside permitted boundaries for the activity or possibly engage in the activity in areas where people reside, or where the activity is prohibited or would otherwise be unsafe. In the hunting or fishing applications, the locates where such activities are permitted may loan out the present invention with the permitted boundaries programmed in and incorporate the cost of the device in the activity license fee or equipment rental fee as well as require a security deposit to ensure the device is returned to the appropriate authorities. Thus, trespassing can be avoided, fishing or swimming in polluted areas, skiing, hiking or climbing in known dangerous areas, or even the mere existence of areas otherwise unhealthy to the individual subject.

Furthermore, the programmable boundary feature of this simple embodiment of the present invention may be used by those individuals with particular susceptibilities, such as those reliant on pacemakers which should not be located in the vicinity of high electromagnetic fields, such as those generated by electric power stations, radar stations, microwave devices, MRI administering locations or the like. Additionally, people with respiratory problems may desire to avoid being near areas of known air pollution, such as near certain types of factories or industrial areas. Accordingly, the present invention may be configured to indicate to its user that he or she has or is about to enter a pre defined area known to have a high incidence of air pollution. For such applications, the locations of facilities generating such adverse conditions may be programmed into the present invention so that it may indicate to its user when he or she is too close to, or is approaching a significant adverse condition such as a high electromagnetic field or an area of hazardous pollution. Likewise toxic waste sites and other generally hazardous locations such as former nuclear power plant sites can be defined for use by the present invention. Similarly, areas where unauthorized occupation may be illegal such as certain airport areas, wildlife ranges, and military areas, may be defined for use by the present invention. As well, areas uniquely hazardous to the particular subject may be defined, such as static charge areas, as concerns an integrated circuit shipment.

Another application of this simple embodiment of the present invention may be used by vehicle rental companies to indicate to its customers that they have or are about to enter a location where a high incidence of crime usually occurs. For instance, certain areas in Florida are known for high incidence of tourist targeted crimes. However, the utility offered by the present invention may be utilized by anyone seeking to avoid entering an adverse area, which may be pre defined.

The present invention may also be used by fleets to efficiently manage their vehicle operations. For example, the intended travel route of a vehicle may be defined for use by the present invention, which may then be configured to alert the device user that he or she is about to or has taken a wrong turn. An early indication that a wrong turn has or is about to be taken may enable corrective means before a significant time delay occurs. This is especially true when a vehicle has past the last exit before crossing a bridge or other like structure, and therefore is forced to use such a structure. In such a case, not only will a significant time delay be incurred due to the traffic conditions associated with such structures, but additionally, an unnecessary toll will likely have to paid. Such an application is of utility to anyone operating a vehicle.

Additionally, by knowing the elapsed time and the distance between measured locations, the speed of the subject can be determined, and as above, compared to pre defined values in order to indicate to the vehicle user via the display means (24b), the substantial coincidence of the compared values. The ability to determine speed coupled with the programmable boundary feature of the present invention allows a device user the ability to be warned via the display means (26b) when he or she has exceed the maximum allowable speed in a particular area.

The memory means may be used as an auditing tool in any of the aforementioned applications to store previously generated location or speed information for review at a later time. For example, parents may allow their children to use the family vehicle, but may desire to restrict such use to traveling to and from school or work. Accordingly, the present invention may be configured to not only alert the vehicle occupant, in this example, the children, that they have gone outside the pre defined boundaries, but may also either continuously store location information or just the occurrence of an out of boundary condition. Then at a subsequent time, the parents may review the stored location information to determine if the subject has traveled outside of the permitted pre defined boundaries, and where the subject has indeed traveled.

Fleets may use the auditing aspect of the present invention to verify operational factors relating to expenses. These can include vehicle running time, distance traveled, and number of times pre defined boundaries have been crossed where those boundaries relate to toll plazas or the like. Accordingly, EZ PASS and fuel bills can be confirmed, and vehicle maintenance may be more appropriately scheduled.

Similarly, speed information may be recorded by the memory means (20b) for review at a later time. Thus, parents may not only monitor where their children have driven the family car, but also how fast. Since the present invention may be worn personally, it provides an improvement over Camhi et. al., in that unsafe conditions may be detected, e.g., excessive speed, independent of the vehicle.

In a modified example of the first embodiment, the processor (12) includes a clock which provides means for determining elapsed time. Accordingly, the present invention affords the opportunity to program a pre-defined grace or "foregiveness" period into the system operation whereby in the event that the user goes outside the programmable geographical boundaries, the user is given a grace period to correct the situation before the information pertaining to such a situation is recorded.

In such a case, the processor (12) may activate the appropriate display means (24) via the display line (26) to indicate to the user that he or she has gone outside the programmable geographical boundaries. However, the recording of the out of boundary condition may be delayed by a pre defined time period to allow correction of the situation. If the situation is not corrected within the pre defined time period, the processor (12) may record pertinent information to the memory means (20) via the memory line (22).

This programmable grace period may also be utilized for other applications performed by the present invention such as when the present invention is monitoring vehicle speed. If the user is speeding, a pre-defined grace period may be programmed into the processor (12b) which allows some time for corrective action prior to data recording. Similarly, the processor (12b) may activate the appropriate display means (24b) via the display line (26b) to indicate to the user the reason for the indication.

Thus, inadvertent actions leading to an out of boundary condition may be corrected before they are recorded. In this configuration, the interactivity of the present invention affords the user control over the recording of information by allowing the user a pre defined time period to correct a situation which would otherwise be recorded.

Figure 2:
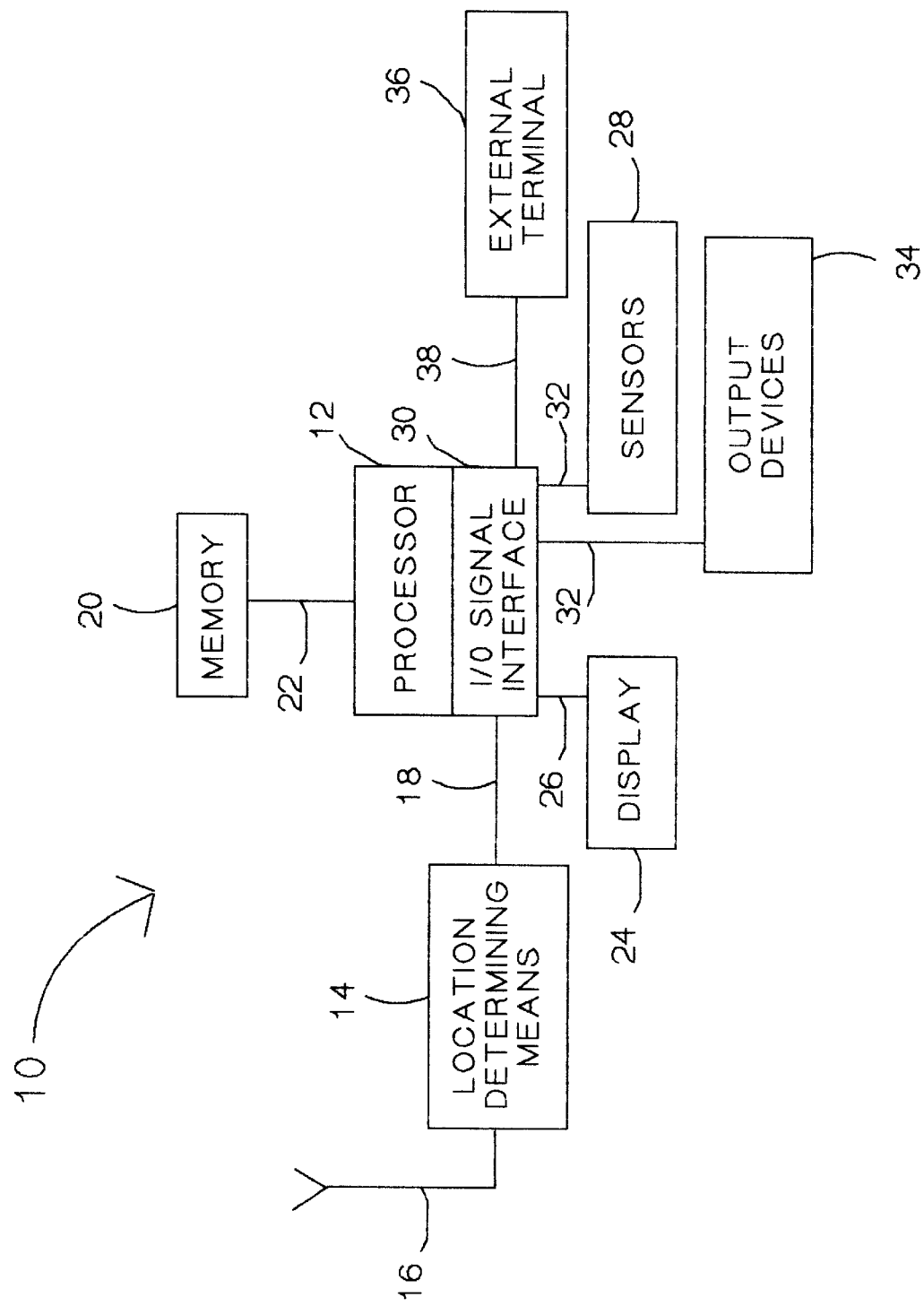
FIG. 2 is a block diagram of an embodiment of the present invention, as equipped with a microcontroller multiple input data acquisition and monitoring unit.

A more complex embodiment of the instant invention is shown in FIG. 2, which utilizes microprocessor (12) in conjunction with the capability to interface with other systems, equipment, and sensors, (28).

In the diagram of FIG. 2, the microprocessor (12) has an I/O signal interface, which is shown as sub-block (30) of processor (12). I/O signal interface (30) provides for the input of information to processor (12b) from other systems, equipment, or sensors, (28), via I/O lines (32). I/O signal interface (30) also provides for the output of information from processor (12) to display means (24) via display line (26) and memory (20) via memory line (22). Furthermore, I/O signal interface (30) provides for the output of information from the processor (12) to other systems, equipment, or other output devices (34), via I/O lines (32). I/O signal interface (30) could also provide for connection and communication with optional external terminal (36), whereby stored information may be retrieved from, or program information or limits or boundaries may be loaded to memory (20), via terminal I/O line (38).

While an equivalent device to that of FIG. 2 may also be fashioned from discrete circuit elements, the use of a microprocessor is deemed desirable at the time of this writing because these microprocessors have recently become increasingly sophisticated and reliable, as well as inexpensive and plentiful. Not only do these microprocessors comprise processors, but within the same integrated circuit, they may also comprise analog to digital converters, serial and parallel input and output channels, read only memory, and random access memory. Because of their greatly expanded abilities, these types of microprocessors are commonly referred to as microcontrollers, and this is the type of device which is contemplated by the instant invention.

Memory (20) can be used as a buffer for temporary storage of monitored input information. Upon the occurrence and detection of catastrophic events such as a severe vehicle collision, the operational history stored in memory (20) may be automatically stored more permanently or transferred to additional, more stable memory means, so that the operating variables in the time period before the occurrence of the catastrophic event would be memorialized for crash analysis and accident reconstruction and liability determination, in much the same way as an aircraft flight recorder. In certain circumstances it may desirable to manually trigger memorialization of this recent history, for example, to dispute a speeding ticket. This should be distinguished from normal recording operation of the instant invention, where only the specific input conditions designated by authorized personnel, and perhaps a time and date stamp, would be recorded.

Consequently, multiple systems, equipment, and other output devices, (34) of varying output signal type are shown coupled to processor (12), via I/O lines (32), so that these items may be actuated. For example, the present invention may be configured to actuate a vehicle's electric door locks. The processor (12), via I/O lines (32), may send an appropriate signal to the appropriate system, equipment, or other output devices, (34), such as alarms, door lock systems, ignition interruption, dye spray, tear gas, power window systems, or other equipment as may be appropriate for the intended application.

An illustrative and non-exhaustive list of systems, equipment, or sensors (28), or other output devices, (34), which may be coupled to the present invention for interaction are as follows: panic button, air bag deployment, anti-lock brake (ABS) use, vehicle speed, vehicle excessive speed, vehicle operator blood alcohol content (BAC), vehicle operator awakeness analysis using coded analysis, vehicle headlight use, vehicle seat belt use, vehicle steering wheel position, vehicle windshield wiper use, throttle position, ambient light, air quality, vehicle $CO_2$ gas analysis, vehicle pollution control air quality, vehicle noxious gas sniffer, cardiovascular monitor for biomedical analysis, vehicle operator blood monitor evaluation for biomedical analysis, vehicle operator breath evaluation for biomedical analysis, vehicle operator drug monitor for biomedical analysis, eyeball movement for biomedical analysis, vehicle door status, vehicle hood status, vehicle trunk status, vehicle window status, vehicle auxiliary alarm status, vehicle occupant compartment temperature, vehicle cargo compartment temperature, vehicle engine temperature, vehicle internal temperature, vehicle external temperature, vehicle internal humidity, vehicle external humidity, vehicle operator compartment and outside vehicle decibel sensor, vehicle or auxiliary equipment battery voltage level, vehicle or auxiliary equipment battery discharge rate, vehicle alignment evaluation, vehicle wheel position, vehicle wheel revolutions, vehicle brake heat, vehicle brake pressure, vehicle brake wear, vehicle freight shift alert, vehicle mechanical operations, vehicle electrical system evaluation, vehicle fire, vehicle tire heat, vehicle tire pressure, vehicle tire wear, vehicle lighting monitor, vehicle load weight, vehicle coolant status, vehicle engine oil status, vehicle transmission fluid status, vehicle brake fluid status, vehicle windshield wiper fluid status, vehicle operator or occupant emergency doctor call, vehicle operator or occupant family call, emergency situation alert, police call, EMS call, vehicle estimated time of arrival (ETA), vehicle fuel consumption, vehicle gas/food service locator, vehicle remote light turn on/off, vehicle remote lock/unlock, vehicle remote start, vehicle remote shut off, vehicle destination input, vehicle distance driven, depth/distance, vehicle engine on/off, vehicle energy management, computer link, vehicle computer printer, vehicle alcohol turn off, vehicle Doppler for accident avoidance and weather analysis, vehicle infrared detector for determining live obstructions in vehicle path, vehicle radar distance, vehicle weather alert, air conditioning use, vehicle entry code, vehicle foot pressure, vehicle inclination, vehicle meter on/off, vehicle motion detector, vehicle multiple vehicle linkup, vehicle seat weight, vehicle toll interface, vehicle traffic laws interface, and vehicle voice writer recognition system. Note that the term vehicle in this specification means any transportation means including automotive, aeronautical, marine as well as a person or even a shipment of goods. Thus, according to the programming stored in the memory (20), a variety of system parameters may be pre-defined and simultaneously monitored. As above, should a parameter fall outside its normal operational value or other pre-defined value, an appropriate indication via display means (24) will then be energized via display line (26) or I/O line (32).

However, the second embodiment of the present invention allows not only for the comparison of a measured value with a pre defined value to determine an adverse condition but also affords the capability to determine if adverse conditions exist in areas that have not been pre defined. Thus, through the use of appropriate sensors, adverse conditions such as air pollution, high magnetic fields, and radiation may be detected by the present invention in order to warn the device user. While the first embodiment of the present invention can accomplish this, it can only be done so in the absence of sensors (28) with respect to speed and location. Thus, combinations of factors may be considered for predefinition of unsafe conditions, e.g., zero miles per hour within the geographical boundaries of a superhighway.

Accordingly, the capability of the present invention to interact with other systems, equipment, and output devices, (34), affords extra means to ensure the safety and security of subjects.

Figure 3:
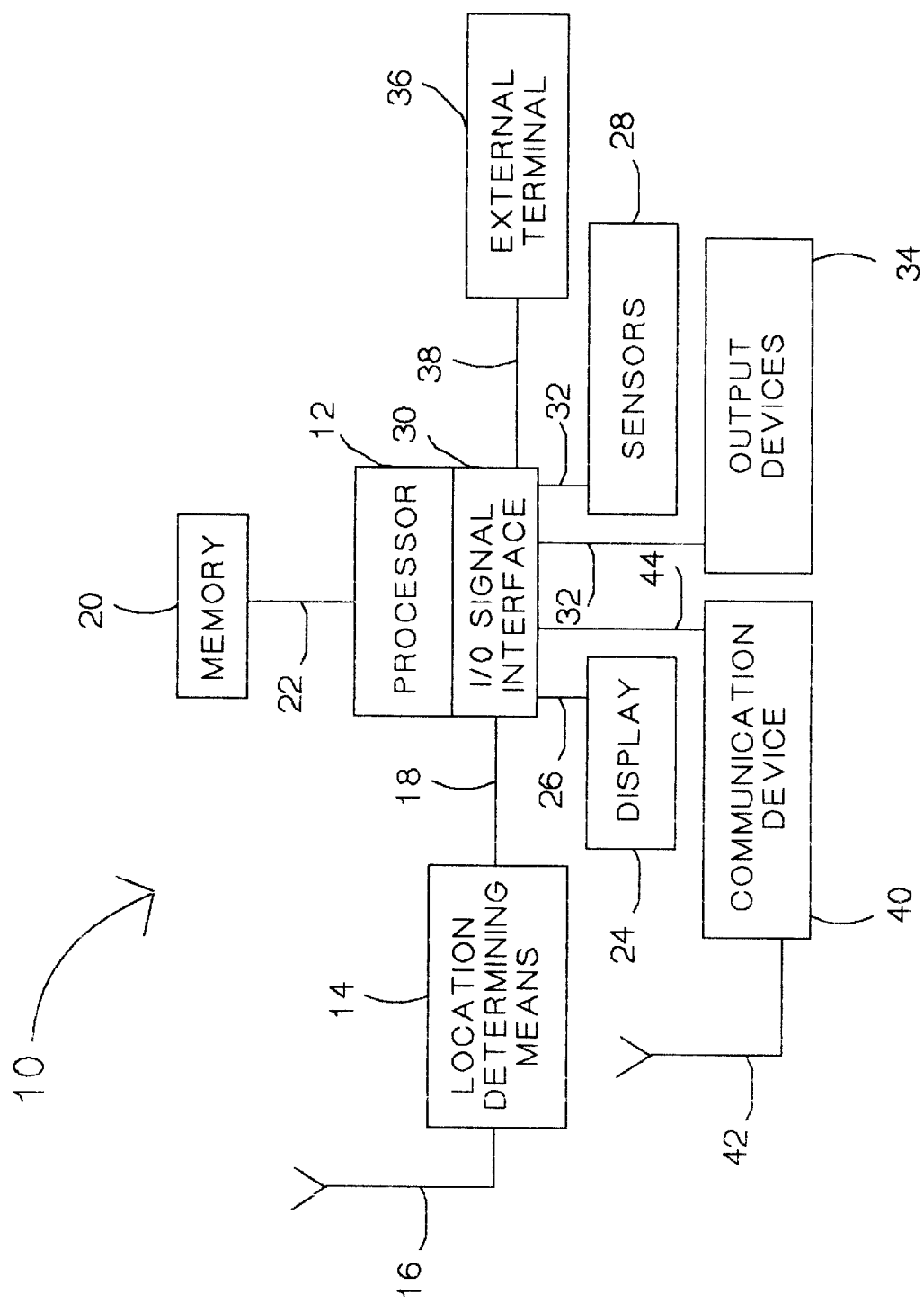
FIG. 3 is a block diagram of a comprehensive embodiment of the present invention, having input output means, sensors and communication means.

A third embodiment of the instant invention is shown in FIG. 3, a block diagram of a more powerful embodiment of the present invention. Included therein, is a communications means (40) and antenna (42) typically associated therewith, for the transmission of information from the device to a remote location or locations. Information may consist of location information, speed, and any other information which is monitored, calculated, or stored by the present invention.

Information is transferred by the processor (12) to the communication means (40) via the communication line (44). The location and or other information may then be received at a remote location which enables third party intervention, such as a monitoring station or via mobile electronic means such as a modem, radio, custom telephone ringing services, or pager. The information may even be transformed to voice communication and sent to a telephone or may be posted on the internet if desired. While any communication means currently known as well as any communication means yet undiscovered are contemplated for use by the present invention, the preferred means of communication at the time of this writing is through the utilization of 800/900 MHz cellular technology.

The processor (12) may be configured to alert a monitoring station or other remote location to the occurrence of an event. The processor (12) may also be configured to send a message to an alphanumeric pager or other indicating device. For example, the processor (12) may be configured to indicate to an alphanumeric pager that the battery voltage level is below a minimum voltage which may be indicative of leaving lights on after exiting the vehicle.

Furthermore, the communication means (40) may be used to interact with other systems, equipment, or sensors, (28), or other output device (34), from a remote location and vice versa. Thus, all functions performed by the aforementioned prior art can be accomplished remotely by the present invention, in addition to its own unique functions.

Depending on system configuration, the processor (12) can be programmed to distinguish between situations requiring one-way or two-way voice communication and activate the appropriate selection. System configuration may include, but is not limited to, air-bag deployment sensors and strategically placed motion and impact sensors. The outputs from these sensors would be coupled to the processor (12) via I/O lines (32). The use of such sensors and corresponding programming of the processor (12) enable the present invention to distinguish between non-criminal activity where a two-way voice communication link is desirable and criminal activity where only a one-way voice communication link is desirable. For example, the actuation of a panic should initiate one-way communication.

A significant disadvantage associated with conventional tracking means is the cost of continuous monitoring. In many instances, the device user may not be able to actuate a panic button to alert a monitoring authority of a potential safety and or security threat. Additionally, with regard to businesses directed to the delivery of valuable cargo such as armored cars, the vehicle occupant or occupants may be unaware, subdued, or involved in the theft and thus may not take the appropriate actions to alert the proper authorities. Thus, for many applications of safety and security devices, continuous monitoring is required. However, continuous monitoring can be quite costly since a monitoring station or other monitoring authority would have to be paid for such continuous service. Alternatively, it may be more desirable to alert concerned parties only when a situation exists which requires intervention and action, such as only when a pre-defined unsafe event occurs. The incorporation of a programmable boundary feature with tracking capability allows for the detection of adverse or unsafe conditions in many situations. For instance, as recited above, armored car personnel may be involved in the theft and may thus not take the appropriate corrective action. However, the incorporation of a tracking means in conjunction with the present invention's programmable boundary feature allows for a remote monitoring station to be alerted that the armored car is off it's pre-defined route without having to continuously monitor the location of the armored car.

Thus, the present invention dispenses with the need for someone to continuously monitor a computer or other screen or data source and alternatively provides an indication when something of interest has occurred, thereby freeing the monitor's time to engage in other tasks. It may be more desirable to alert concerned parties only when the present invention goes outside programmed geographical boundaries which may exist in several stages. Therefore, an operator can be notified when he or she travels slightly out of boundaries and given an opportunity to correct the situation, but a concerned individual may be directly and automatically notified when a subsequent level of geographical boundaries is traversed, indicating the subject is grossly out of bounds and perhaps involved in theft, foul play or other undesirable activity such as frolic and detour.

Thus, the present invention therefore allows the user to custom tailor the operation of the present invention depending on his or her needs or financial resources. The integration of user-defined programmable geographical boundaries with a tracking system allows for numerous applications. Parents may allow their children to borrow the family car but may want to restrict the use of that car to certain geographical areas they consider safe. For example, perhaps the parents only want the car to be used for transportation to and from work or school. Accordingly, the parents may simply and easily define the geographical area or areas that are permissible routes for the children to travel. If the children go outside these permissible areas, the device can then alert the parents and provide the parents with the actual location of the vehicle in real time. Alternatively, perhaps the parents do not want their children in seedier parts of town or known drug trafficking locations. Accordingly, the parents may simply and easily define the geographical areas that are "off limits," and obtain an indication when the children have traveled in such areas.

Additionally, another application of the device can be used to counter child abductions. The present invention may be configured to alert parents that their child has just been dropped off at his or her bus stop by the school bus so that the parents may intercept the child. Obviously, the younger the child, the more utility such an application offers. For such an application, the device would be mounted in a school bus and the device would be configured to determine the proximity of the school bus to a particular child's bus stop. When the bus is at a particular child's bus stop, the device may be configured to directly alert the parents of the children associated with that bus stop. This can be accomplished via indicative means such as dialing the child's telephone number and initiating a pre-recorded message or custom ringer, or via a beeper or pager, or any other indicating means. Such a system would presumably be implemented by a school district.

An application of even greater utility would be to mount the device to the child subject's person, lunchbox or school bag so that the location of the child may be known at all times or, through the use of the inclusive or exclusive programmable boundaries, to simply alert the parents when the child is at location that he or she should not be. Thus, the present invention may be used by parents to determine truancy from school. Ideally, the child can be given a warning and opportunity to return to a "safe" location or a location that they should be at with the alarm being silent or tactile in nature so as not to alert a potential miscreant to the presence of the unit.

Additionally, the enhanced capabilities of the present invention over conventional tracking devices offers significant advantages with regard to fleet management. The use of conventional tracking devices by fleet managers to monitor the location of their vehicles allows for improved dispatch capabilities and other advantages. However, additional useful information may be provided by a device which allows a fleet manager to define primary and alternate geographical routes and not monitor the vehicles further unless an alert is initiated by uncorrected deviation from the pre defined routes. For example, since it is unlikely that a fleet manager can constantly monitor the location of all vehicles at all times, it is unlikely that he will notice if a vehicle has stopped for a lengthy unauthorized rest period or if a vehicle has deviated from its route due to frolic and detour, theft or hijacking. However, the present invention affords a fleet manager a safety and security system that does not require user action or continuous monitoring in order to detect threats to safety and security. Furthermore, the programmable geographical boundary feature of the present invention is not only useful for the detection of intentional adverse conditions but also can be configured to simply alert the vehicle operator that he or she is off their route and doesn't yet know that they are lost. Therefore, an unintentional wrong turn by a vehicle operator can be immediately indicated to the vehicle driver and corrected before significant time is lost or an alarm is generated. The present invention may be used by fleet operators which travel via automotive, marine, aeronautical, or any other transportation means.

Another application of the embodiment of the present invention is the monitoring of valuable cargo. The present invention may be installed in returnable shipping containers or annexed vehicle trailer. The containers may be monitored continuously or the system may be configured to provide an alert in the event that the cargo travels outside the geographical boundaries or that the doors are open in a place other than the destination.

Another example related to the monitoring of cargo relates to the shipping and storage of hazardous material such as radioactive materials. Specially fabricated containers are required to ship radioactive and other hazardous materials. In many instances, the amount of radioactive or hazardous material to be disposed of is able to be determined by monitoring authorities i the case of certain uses. Thus, the number of special containers needed for disposal of those materials may also be calculated and determined. The present invention may be mounted to these specially manufactured containers. Since there are a limited number of locations that certain hazardous materials such as radioactive waste may be disposed at, these locations may be programmed into the present invention. Consequently, the present invention may be configured to indicate to a monitoring authority such as the Environmental Protection Agency or other concerned monitoring authority when such a container and its contents have been disposed of in a location other than the specified locations for such materials. The containers may then be located and retrieved before potential significant damage to the environment can occur. Markings on such containers may allow the proper authorities to trace the users of the specific containers involved in the offense so that the responsible parties may be subject to the appropriate punishment. Incorporation of the present invention into such containers may be implemented with or without the knowledge of the purchasers of such containers. Obviously their lack of knowledge with regard to the incorporation of the present invention further ensures the successful implementation of the present invention for such an application.

Additionally, certain areas may be contaminated and restricted from certain activities such as commercial fishing. The present invention may be configured to alert a monitoring authority that a particular boat has been located in a restricted area for a certain period of time and is thus likely fishing in that contaminated area. Accordingly, the providing of a commercial fishing license may be contingent on the payment of the appropriate fee and the use of the present invention in order to allow the proper authorities to determine if fishing has occurred in these restricted areas. The cost of implementing the present invention may be incorporated into the cost of the license, with a security deposit required while the device is loaned out for use. Furthermore, the appropriate licensing authority may simply require that the device be purchased by those seeking to acquire a license. The affects of ingesting hazardous and contaminated material is different in children or the elderly as compared to those in between, and these varying limits taken into account when defining boundaries. Accordingly, the present invention may be used to guard against adverse condition that affect society in different ways.

As an auditing tool, the implementation of a information storage device allows location and other information to be stored as a normal business record for later use. For example, a fleet manager may use the stored location information of a particular vehicle to defend against a parking ticket or other vehicle infraction by proving that the vehicle was not at the location specified by the summons. Distance traveled, running time, and the number of times significant locations such as toll plazas have been passed, enables management and verification of operation expenses as described above. The integration of the present invention with a driver verification means such as a retinal scan enables a monitoring authority to determine if a particular driver has been operating a vehicle for too long a period of time which may lead to the particular driver falling asleep at the wheel. Reviewing stored information after the occurrence of an accident may be of use in accident recreation by the fleet company or bay an insurance company or law enforcement agency. The auditing function of the present invention may be used by authorities such as the Taxi and Limousine Commission to verify complaints of excessive charges by customers. The particular route taken by a taxicab or limousine driver may be downloaded and reviewed after a complaint has been filed against a particular driver to verify if indeed the driver overcharged a particular customer or took an out of the way route in order to bolster the charge for the ride. Taxi fleet owners may use the apparatus to audit and confirm the daily receipts of the drivers.

Additionally, insurance companies themselves may utilize such a device in order to determine their rates. For instances, an insured may claim that a vehicle is only used locally, which happens to be a low risk area. Consequently, his or her insurance costs may be lower than someone who uses a vehicle in high risks areas where greater traffic, a higher incident of vehicle theft and other adverse conditions are present. Insurance companies may condition low rates on the installation of a vehicle tracking system which can then be used to verify where an insured drives. However, the use of conventional tracking means is impractical since it would require an insurance company to constantly monitor the location of a vehicle. Accordingly, the use of the present invention and its programmable geographical boundary feature affords the insurance company the ability to be alerted only when a particular vehicle goes outside pre-defined geographical boundaries. Alternatively, the device may be configured to simply record only when the device has traveled outside the boundaries and the information can be uploaded periodically from the vehicle to the insurance company for examination for examination, or to record when the vehicle is not in use for prolonged periods of time, to confirm seasonal usage of a vehicle.

Additionally, the present invention may be utilized to verify an individuals compliance with conditions of probation imposed by a court. It is not uncommon for probation to be conditioned on the fact that the person subject to probation not associate with known felons and also not frequent known drug or other criminal locations such as those frequented by organized crime, militias, and gangs. It is well known that certain criminal organizations frequent the same location to meet and discuss their criminal activity. For example, it is well known that certain organized crime families meet at so called "social clubs" to discuss and further their criminal activity. Such a location would obviously be off limits to certain people subject to probation for related activities. Accordingly, the present invention afford the capability to determine if a particular person has frequented such a location, either in real time, or via the recording means of the present invention. Likewise, orders of protection may be enforced.

A related application of the present invention pertains to house arrest and half-way house programs. Current devices utilized in house arrest programs utilize proximity detectors integrated with auto dial devices to alert the proper authorities that a subject has traveled too far from his or her home. However, the present inventions programmable geographical boundary and interactivity features offer greater flexibility with respect to both types of programs. Perhaps it may desirable for the subject to be allowed to leave his or her home for the sole purpose of employment. Accordingly, the present invention could be configured so that the location of employment, routes to and from the place of employment, and times of employment, are programmed into the device whereby the device would automatically alert the proper authorities when the subject has traveled outside the pre-defined boundaries at a particular time. The present invention would thus dispense with the need for continuous monitoring.

Furthermore, with respect to the probation, house arrest, and half-way house applications, the additional capability of one and two-way voice communication would allow the proper authorities to listen in on conversations in the vicinity of the subject as well as allow the authorities to communicate with the subject.

Moreover, the use of vehicle tracking systems may offer significant financial benefits to certain types of businesses as well as individual vehicle owners. Automobile insurance companies are required by many states to offer discounts to vehicle owners who have tracking systems installed in their vehicles. Thus, vehicle rental, taxicab, limousine, and delivery companies may realize substantial savings in their insurance premiums by using vehicle tracking systems. Individual, non-commercial, vehicle owners utilizing vehicle tracking systems may also realize similar insurance savings.

Another application of the present invention allows fleet managers, insurance companies, and parents to monitor vehicle drivers for their engagement in unsafe practices such as excessive vehicle speed. Such a capability allows the identification and or elimination of speeders and other abusive or unsafe vehicle operators. Additionally, while the safety and security of fleet vehicles is of paramount importance, the ability to monitor other conditions such as the temperature in a refrigerated truck delivering lobsters or other perishable goods is also of great utility. Indeed, if the doors of a delivery device are open before the delivery device reaches its destination, the capability to alert the vehicle operator or delivery person or a remote location is offered by the present invention, irrespective of whether the delivery device is a truck body, railroad car, shipping container or some other type of delivery device. This type of configuration utilizes the programmable boundary feature of the present invention in combination with the ability of the present invention to communicate with other systems.

Other law enforcement applications include car theft sting operations, surveillance, and automatic summoning of assistance. When used in combination with medical monitoring devices, "officer down" situations may be detected by extreme levels of blood pressure, heart rate, and the like. Thus, the device may be used to notify a central monitoring station of circumstances indicating that an officer needs assistance when the officer may not conveniently be able to do so, with an interactive feature allowing cancellation of the alert.

Due to the numerous number of sensors, systems, and services that may be interfaced with the open architecture of the present invention, a beneficial application can be found for almost any situation. For instance, cargo shipping companies may desire the present invention to be configured to alert the cargo deliverer that he or she has gone outside the programmable geographical boundaries. However, the occurrence of such an event may be involuntary and the result of foul play such as a hijacking. Thus, it may desirable to alert the deliverer through tactile means so as to not alert a criminal to the presence of the system. Furthermore, the system may be configured to allow the deliverer a certain period of time to correct the out-of-boundary situation. If, after the deliverer has been alerted to the out-of-boundary condition and the condition has not been corrected within a certain period of time, the ability of the present invention to interact and or initiate other system may be utilized. For example, if money is being delivered from location to location, the money may be placed in a container coupled to the present invention which in turn may be coupled to an explosive dye pack located in the shipping container. If, after the deliverer is alerted through tactile means that he or she is out of bounds and he or she has not corrected the situation with a certain time period, and further, that he or she has not initiated some means to cancel the alarm condition, the dye pack may be automatically triggered or it may be triggered remotely by a monitoring authority cognizant of the situation as it is occurring or upon the opening of the container when out of bounds. Such a configuration may also be used when shipping electronic equipment, where an electronic device designed to emit an electromagnetic pulse can be triggered to render the electronic equipment useless and thus unable to dilute the company's sales.

Additionally, the military is heading development of devices which emit sound of a frequency which renders humans disoriented and nauseous if they are proximate to and exposed to such sound. The frequency of the sound disrupts equilibrium among other adverse side effects. Accordingly, use of such a device in conjunction with the present invention in a vehicle scenario offers a new means to halt the occurrence or furtherance of crimes such as car-jackings, vehicle thefts, etc. Although a "friendly" vehicle occupant may be affected by the device, nausea and disorientation is not too high a price to pay if the assailant is captured, run off or rendered incapable of committing great violence including murder. However, if such a configuration is mounted in a shipping container containing valuable cargo, it is likely that the thieves will abandon the cargo, where it may be easily tracked and intercepted.

Furthermore, the present invention may be coupled to interact and automatically or manually enable a video recording system to record a visual record of the events. Enablement of the video recording means may be facilitated by an out-of-boundary condition. The video information may then be used to identify criminals involved in a crime as well as evidence in court.

Another application of the present invention relates to the prevention of friendly fire conditions in military, law enforcement, and other related situations. For example, in a military situation, the present invention may be mounted in a "friendly" subject such as a person, armored personal carrier, tank, helicopter, or radar station. The device may be configured to transmit it's location and the fact that it is "friendly" to other "friendly" devices in the vicinity. This information alone may be sufficient, but additional safety means may be integrated to further diminish the likelihood of a friendly fire. For instance, the transmitted location information of "friendly" devices may be used by weapon navigation systems so that a friendly location is excluded as a possible target. This may be accomplished by rendering the firing system of a weapons system inoperative when it is directed to a friendly location.

This type of application may also be used to render a missile's arming device inoperable when the missile is off target and is likely to hit an unintended target. In such a circumstance, the present invention may be mounted in a missile with its intended route or routes of travel and its final destination programmed into the device. Then, if the missile suffers a failure which alters its intended course, an out-of-boundary condition will initiate a means to disarm or prevent the arming of any explosive or other similar device aboard the missile. Thus, while the missile might still strike an unintended target, the aftermath will be reduced in significant magnitude.

The present invention may be also utilized to prevent accidental shootings of hunters by other hunters. For example, the present invention may be integrated to a firearm such as a rifle. In such a circumstance, a compass or other direction determining means is mounted to a firearm so that the direction of fire can be determined by the processor of the present invention. Further, the location of other hunters in the area using said device is also communicated to each individual device. The device then uses the aforementioned information to determine if the direction of fire the hunter is intending to shoot at coincides with the position of another hunter. If so, an indicator associated with the firearm will alert the hunter.

Additionally, the ability of the present invention to interface with numerous other systems offers a greater degree of safety and security to device users. For instance, integration of the present system with proximity determining means allows automotive, aeronautical, marine and other transportation means users to be alerted to obstacles in their path of travel. Thus, in the case of a plane traveling over a mountainous region in extremely poor weather, the programmable boundary feature of the present invention may be configured to alert the airplane operator that he or she is heading directly toward a mountain. However, the coupling of the present invention with other systems, such as an infrared proximity determining system, would provide a redundant means to determine proximity to objects and thus greatly reduce the likelihood of an accidental crash.

To the extent that many devices practicing the instant invention may be dispersed across wide areas, particularly in the case of sensor and communication equipped embodiments, the parameters monitored by these devices may be used to provide information of more general interest to a (central data base) for evaluation, compilation, and redistribution. Thus, local traffic patterns, environmental conditions, and other situations of general interest may be offered distributed to interest parties to use as they see fit.

Thus, the present invention offers applications and benefits to the civilian safety and security market, as well as to fleet management, the insurance industry, cargo storage and or transportation, and law enforcement.

It will be appreciated by those of skill in the art that the above elements may be implemented in a variety of forms, from simple to complex, with corresponding variations in fabrication expense and the amount and detail of information monitored, stored and transmitted, without departing from the spirit and scope of the instant invention. Accordingly, while the above description contains many specificities, these should not be construed as limitations of the scope of the present invention, but rather as exemplifications of the preferred embodiments thereof, and the scope of the instant invention should not be determined by the particular embodiments shown, but rather by the claims appended hereto, and their legal equivalents.

What is claimed is:

1. A system for monitoring a subject which moves about various geographic locations, the system comprising: means for determining the specific geographic location of the subject, a sensor monitoring at least one physiological parameter of the subject, the means for determining location generating a location signal including data representative of the specific geographic location of the subject, the sensor generating a status signal including data representative of the condition of the monitored physiological parameter, a processor, a memory associated with the processor, the memory storing physiological parameter data, the processor being operatively connected to the means for determining location and to the sensor, the processor receiving the location signal and the status signal, the processor accessing the memory and comparing the status signal data with the stored physiological parameter data, the processor determining whether the status signal data lies within a permitted range, the processor generating a signal for initiating corrective action and a signal representative of the specific geographic location of the subject when the status signal data does not lie within the permitted range.

2. A system for monitoring a subject as constructed in accordance with claim 1, wherein the processor is wirelessly coupled with a central network.

3. A system for monitoring a subject as constructed in accordance with claim 2, wherein the central network is operatively connected to plurality of like monitored subjects.

4. A system for monitoring a subject as constructed in accordance with claim 1, the system further comprising means for receiving the signal for initiating corrective action and in response thereto, actuating corrective action associated with a motor vehicle.

5. A system for monitoring a subject as constructed in accordance with claim 4, wherein the corrective action comprises interruption of a motor vehicle ignition circuit.

6. A system for monitoring a subject as constructed in accordance with claim 1, wherein the physiological parameter comprises a blood constituent level of the subject, the subject being an operator of a motor vehicle.

7. A system for monitoring a subject as constructed in accordance with claim 6, wherein the blood constituent comprises blood alcohol content.

8. A system for monitoring a subject as constructed in accordance with claim 1, wherein the physiological parameter comprises a heart rate of the subject.

9. A system for monitoring a subject as constructed in accordance with claim 1, the system further including a time delay, the time delay retarding the generation of the signal for initiating corrective action for a period sufficient for the subject to verify that there is no sensor error.

10. A system for monitoring a subject as constructed in accordance with claim 1, wherein the sensor comprises a medical monitoring device.

11. A system for monitoring a subject as constructed in accordance with claim 1, further including a memory for recording deviations of the status signal data from the permitted range.

12. A system for monitoring a subject as constructed in accordance with claim 11, the system further including a time delay, the time delay retarding the recording of deviations of the status signal data for a period sufficient for the subject to initiate self corrective action.

13. A system for monitoring a subject which moves about various geographic locations, the system comprising: means for determining the specific geographic location of the subject, a sensor monitoring at least one physiological parameter of the subject, the means for determining location generating a location signal including data representative of the specific geographic location of the subject, the sensor generating a status signal including data representative of the condition of the physiological parameter, a processor, a memory associated with the processor, the memory storing physiological parameter data and geographic location data, the processor being operatively connected to the means for determining location and to the sensor, the processor receiving the location signal and the status signal, the processor accessing the memory and comparing the status signal data with the stored physiological parameter data and comprising the location signal data with the stored geographic location data, the processor determining whether the status signal data lies within a permitted range and whether the location signal data lies within a permitted range, the processor generating a signal for initiating corrective action and a signal representative of the specific geographic location of the subject when the data of either signal does not lie within its respective permitted range.

* * * * *